(12) United States Patent
Boss et al.

(10) Patent No.: US 9,715,820 B1
(45) Date of Patent: Jul. 25, 2017

(54) CUSTOMIZING GROUP ALARMS

(71) Applicant: International Business Machines Corporation, Armonk, NY (US)

(72) Inventors: Gregory J. Boss, Saginaw, MI (US); Harini Jagannathan, San Jose, CA (US); Kevin C. McConnell, Austin, TX (US); Minh Q. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/172,218

(22) Filed: Jun. 3, 2016

(51) Int. Cl.
*G08B 27/00* (2006.01)
*H04L 29/08* (2006.01)

(52) U.S. Cl.
CPC .......... *G08B 27/00* (2013.01); *H04L 67/1046* (2013.01); *H04L 67/1048* (2013.01)

(58) Field of Classification Search
CPC .. G08B 27/00; H04L 67/1046; H04L 67/1048
USPC ............................ 340/506, 538, 3.1; 709/203
See application file for complete search history.

(56) References Cited

U.S. PATENT DOCUMENTS

| 2012/0163380 | A1* | 6/2012 | Kolbe ................. H04L 12/1895 370/390 |
| 2013/0091262 | A1* | 4/2013 | Rajakarunanayake G06Q 30/00 709/223 |
| 2013/0198271 | A1 | 8/2013 | Yu et al. |
| 2013/0346207 | A1* | 12/2013 | Qi ..................... G06Q 30/0267 705/14.64 |
| 2014/0354161 | A1* | 12/2014 | Aggarwal .......... H05B 37/0245 315/153 |
| 2016/0220177 | A1* | 8/2016 | Proud .................. A61B 5/4809 |

FOREIGN PATENT DOCUMENTS

| CN | 103974204 A | 8/2014 |
| WO | 2011041868 A1 | 4/2011 |
| WO | 2013139066 A1 | 9/2013 |
| WO | 2015106230 A1 | 7/2015 |

\* cited by examiner

*Primary Examiner* — Daryl Pope
(74) *Attorney, Agent, or Firm* — Gilbert Harmon, Jr.

(57) ABSTRACT

An approach to providing a group alarm clock wherein the next group alarm is specified by a group member acknowledging a previous group alarm. The approach allows members to join a group alarm clock and provide alarm preferences to the group alarm clock. When the approach determines that the conditions of activating a group alarm are met, the group alarm is sent to the group members. The first group member to acknowledge the group alarm selects the alarm for the next round and is removed from the group. Iterations of group alarms continue until the group alarm clock no longer has any members.

20 Claims, 3 Drawing Sheets ic # CUSTOMIZING GROUP ALARMS

BACKGROUND OF THE INVENTION

The present invention relates generally to management of group alarms for an event and more specifically, to customized setting of subsequent alarms for the event based on group member alarm acknowledgement.

Most individuals rely on an alarm clock to assist them in starting their day on time. Some dread the trauma of waking up to the sound of a shrieking alarm and quickly hit the snooze button to silence the alarm and drag out the wakeup process. Alarm clocks do not provide any motivation to awaken other than silencing the shrill alarm.

SUMMARY

According to an embodiment of the present invention, a method for setting a plurality of group alarms for a group alarm clock by a plurality of members of the group alarm clock, the method comprising: a) receiving, by a group alarm application, a plurality of requests for membership in a group alarm clock by a group of members; b) configuring, by a group alarm application, a group alarm based on information associated with the group of members; c) determining, by the group alarm application, if a condition associated with activating the group alarm has been met; d) responsive to determining, by the group alarm application, that the condition has been met, sending the group alarm toward the group of members; e) receiving, by the group alarm application, an acknowledgement of the group alarm sent by a member of the group of members; f) removing the member sending the acknowledgement from the group of members; g) configuring, by a group alarm application, a next group alarm based on information associated with the prior acknowledgement; h) determining, by the group alarm application, if a next condition associated with activating the next group alarm has been met; i) responsive to determining the next condition has been met, sending, by the group alarm application, the next group alarm toward the group of members; and j) receiving, by the group alarm application, an acknowledgement of the next group alarm from a member of the group of members.

According to another embodiment of the present invention, a computer program product for setting a plurality of group alarms for a group alarm clock by a plurality of members of the group alarm clock, the computer program product comprising: one or more non-transitory computer readable storage media and program instructions stored on the one or more non-transitory computer readable storage media, the program instructions comprising:

a) program instructions to receive, by a group alarm application, a plurality of requests for membership in a group alarm clock by a group of members; b) program instructions to configure, by a group alarm application, a group alarm based on information associated with the group of members; c) program instructions to determine, by the group alarm application, if a condition associated with activating the group alarm has been met; d) responsive to program instructions to determine that the condition has been met, program instructions to send, by the group alarm application, the group alarm toward the group of members; e) program instructions to receive, by the group alarm application, an acknowledgement of the group alarm sent by a member of the group of members; f) program instructions to remove the member sending the acknowledgement from the group of members; g) program instructions to configure, by a group alarm application, a next group alarm based on information associated with the prior acknowledgement; h) program instructions to determine, by the group alarm application, if a next condition associated with activating the next group alarm has been met; i) responsive to determining the next condition has been met, sending, by the group alarm application, the next group alarm toward the group of members; and j) receiving, by the group alarm application, an acknowledgement of the next group alarm from a member of the group of members.

According to another embodiment of the present invention, a computer system for setting a plurality of group alarms for a group alarm clock by a plurality of members of the group alarm clock, the computer system comprising: one or more computer processors; one or more non-transitory computer readable storage media; program instructions stored on the one or more non-transitory computer readable storage media for execution by at least one of the one or more computer processors, the program instructions comprising: a) program instructions to receive, by a group alarm application, a plurality of requests for membership in a group alarm clock by a group of members; b) program instructions to configure, by a group alarm application, a group alarm based on information associated with the group of members; c) program instructions to determine, by the group alarm application, if a condition associated with activating the group alarm has been met; d) responsive to program instructions to determine that the condition has been met, program instructions to send, by the group alarm application, the group alarm toward the group of members; e) program instructions to receive, by the group alarm application, an acknowledgement of the group alarm sent by a member of the group of members; f) program instructions to remove the member sending the acknowledgement from the group of members; g) program instructions to configure, by a group alarm application, a next group alarm based on information associated with the prior acknowledgement; h) program instructions to determine, by the group alarm application, if a next condition associated with activating the next group alarm has been met; i) responsive to determining the next condition has been met, sending, by the group alarm application, the next group alarm toward the group of members; and j) receiving, by the group alarm application, an acknowledgement of the next group alarm from a member of the group of members.

DETAILED DESCRIPTION

The embodiments depicted and described herein recognize that people dread alarm clocks and the wakeup process associated with the shrill sound of an alarm. Further, that the sleep feature of an alarm clock can delay the point at which an individual rises to begin their day. The embodiments depicted and described herein recognize the benefits of providing further motivation to rise each morning to begin their daily activities. The embodiments described herein can provide motivation to wake up quicker based on an interactive activity, e.g., a competition to be the first to acknowledge the alarm as part of an interactive group alarm.

Embodiments herein describe an alarm clock shared by a group of users, e.g., a social media group, a calendar event group, etc., and provides each user the capability to dynamically modify the group alarm clock based on actions such as, but not limited to, an order of response and/or response time. The group alarm clock system comprises capabilities to configure a user's preferred alarm types and group alarm clock attributes. For example, depending on a response time to a wake up group alarm in a group setting, each responder can earn the privilege to customize the next group alarm type for the remaining users in the group and once all of the group members have acknowledged a group alarm, the embodiment deactivates the group alarm. The "passing the baton" nature of selecting the next alarm for the remaining group members adds a gaming competition nature to provide motivation to be the first, or next, to acknowledge the alarm.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
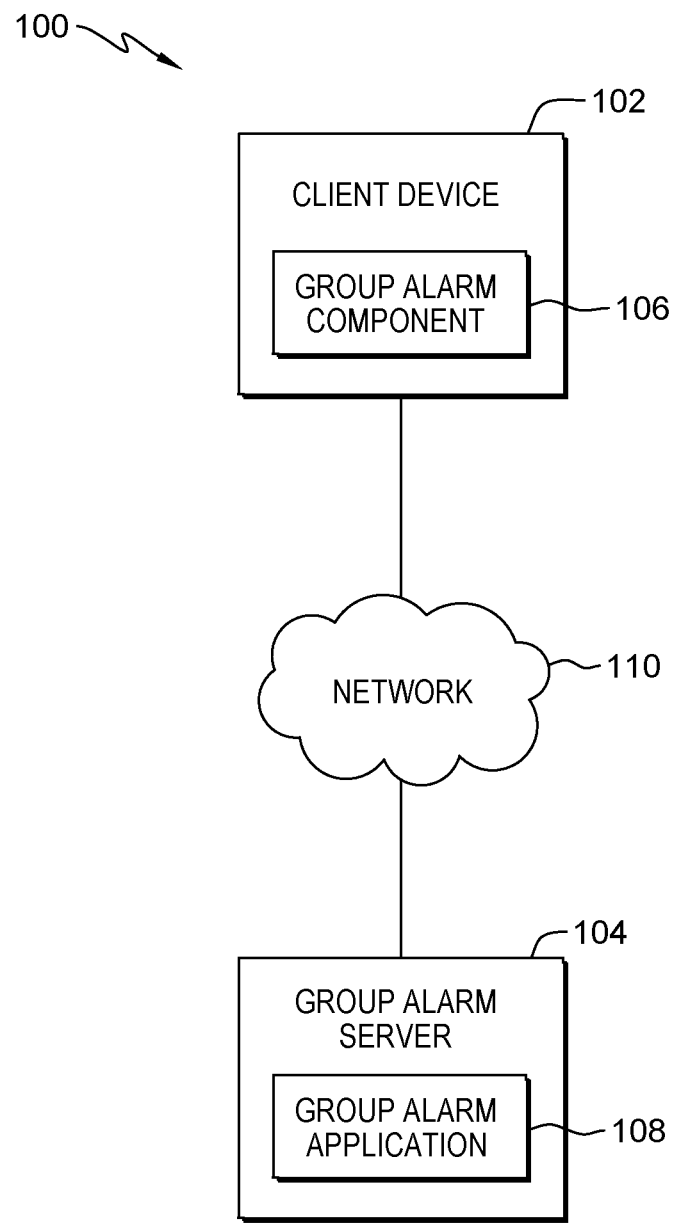
FIG. 1 is a functional block diagram generally depicting a group alarm environment, in accordance with an embodiment of the present invention.

FIG. 1 is a functional block diagram illustrating, generally, an embodiment of a group alarm environment 100. The group alarm environment 100 comprises one or more group alarm components 106 operating on one or more client devices 102, respectively, a group alarm application 108 operating on a group alarm server 104 and a network 110 supporting communications between the one or more client devices 102 and the group alarm server 104.

Client device 102 can be a standalone computing device, management server, a web server, a mobile computing device, or any other electronic device or computing system capable of receiving, sending, and processing data. In other embodiments, client device 102 can represent a server computing system utilizing multiple computers as a server system. In another embodiment, client device 102 can be a laptop computer, a tablet computer, a netbook computer, a personal computer, a desktop computer or any programmable electronic device capable of communicating with other computing devices (not shown) within group alarm environment 100 via network 110.

In another embodiment, client device 102 represents a computing system utilizing clustered computers and components (e.g., database server computers, application server computers, etc.) that act as a single pool of seamless resources when accessed within group alarm environment 100. Client device 102 can include internal and external hardware components, as depicted and described in further detail with respect to FIG. 4.

Group alarm component 106 can be a framework for allowing interaction with group alarm application 108 operating on group alarm server 104. The group alarm component 106 provides the capability for actions such as, but not limited to, registering with a group alarm application 108, configuring parameters associated with registration, creating and/or joining a group alarm, acknowledging a group alarm and selecting a subsequent group alarm associated with the acknowledgement. In another aspect, group alarm component 106 receives notification to generate an alarm at the client device 102, based on the registered configuration and activates the group alarm on the client device 102 at the defined time.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client device 102 and group alarm server 104.

Group alarm server 104 can be a standalone computing device, management server, a web server, a mobile computing device, or any other electronic device or computing system capable of receiving, sending, and processing data. In other embodiments, group alarm server 104 can represent a server computing system utilizing multiple computers as a server system. In another embodiment, group alarm server 104 can be a laptop computer, a tablet computer, a netbook computer, a personal computer, a desktop computer, or any programmable electronic device capable of communicating with other computing devices (not shown) within group alarm environment 100 via network 110.

In another embodiment, group alarm server 104 represents a computing system utilizing clustered computers and components (e.g., database server computers, application server computers, etc.) that act as a single pool of seamless resources when accessed within group alarm environment 100. Group alarm server 104 can include internal and external hardware components, as depicted and described in further detail with respect to FIG. 4.

Embodiments of group alarm application 108 provide the capability for a group of users to register a group alarm clock. The group alarm clock is configurable with an alarm time shared by the members of the group alarm clock. When the group alarm activates, at the initial alarm time, the group alarm application 108 awards the first group member to acknowledge the alarm the right to select the alarm for the second round. The group alarm application 108 sends the second round alarm to the group members not credited, by group alarm application 108, with acknowledging an alarm. It should be noted that the group alarm application 108 will dispatch the second round alarm within a short period of time, defined by the group members as part of registering a group alarm clock. This process continues through succeeding rounds until all the members of the group alarm clock have acknowledged an alarm. It should further be noted that the alarms ca comprise typical alarm noise, e.g., beeps, ringing or buzzes, music, Internet of Things (IoT) devices/wearables such as, but not limited to smartTV, lights, fitbit, smartwatch, etc. In another aspect, commercial alarms such as, but not limited to, product announcements and/or advertisements can be presented to the alarm group members as an alarm or part of an alarm.

Figure 2:
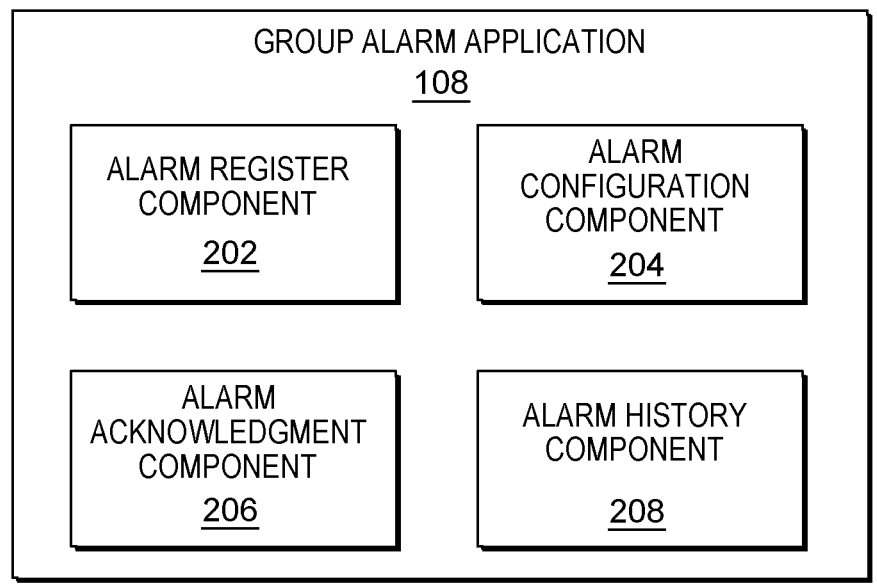
FIG. 2 is a functional block diagram depicting a group alarm application, in accordance with an embodiment of the present invention.

FIG. 2 is a functional block diagram 200 depicting group alarm application 108 comprising alarm register component 202, alarm configuration component 204, alarm acknowledgement component 206 and alarm history component 208.

Alarm register component 202 of an embodiment of the present invention provides the capability to create a group alarm clock and allow users to register their client device 102 to receive the group alarm when the group alarm clock determines a group alarm has occurred. It should be noted in the embodiment that a group alarm comprises a list of the group members, information associated with the group members and information associated with the group alarm. The information associated with the group alarm comprises an initial alarm type, an initial alarm activation time and/or event and a delay time and/or event before a subsequent alarm. The information associated with the group members comprises group member identity, device address, alarm preferences, etc.

Alarm configuration component 204 of an embodiment of the present invention provides the capability to define the parameters associated with a group alarm. For example, the date and time an alarm should be activated or the occurrence of the event activating the alarm. A member of the group alarm clock can provide the data via his associated group alarm component 106 on his client device to the alarm configuration component 204. In another aspect of the embodiment, the preferred alarm types can be provided by each group member such that a group member can receive a preferred alarm based on the type of device currently associated with the group member.

Alarm acknowledgement component 206 provides the capability to receive an alarm acknowledgement from a group member and, in some embodiments, an alarm identifier for use as a subsequent group alarm. It should be noted in the embodiment that only the first acknowledgment's alarm identifier, received after an alarm, is used for the subsequent group alarm and the group member associated with the acknowledgement is removed from subsequent alarm notifications and acknowledgements.

Alarm history component 208 provides the capability to store data associated with a group members alarm preferences, client devices and alarm acknowledgement response times. Further, statistics can be stored over multiple group alarm clock occurrences for rebalancing, e.g., if a group member exceeds a predetermined threshold for unpleasant alarms and the group member selects another unpleasant alarm for the remaining group, the group alarm application 108 will no longer permit the selection of an unpleasant alarm by the group member and can decide to set the group member's personal alarm to an unpleasant alarm.

Figure 3:
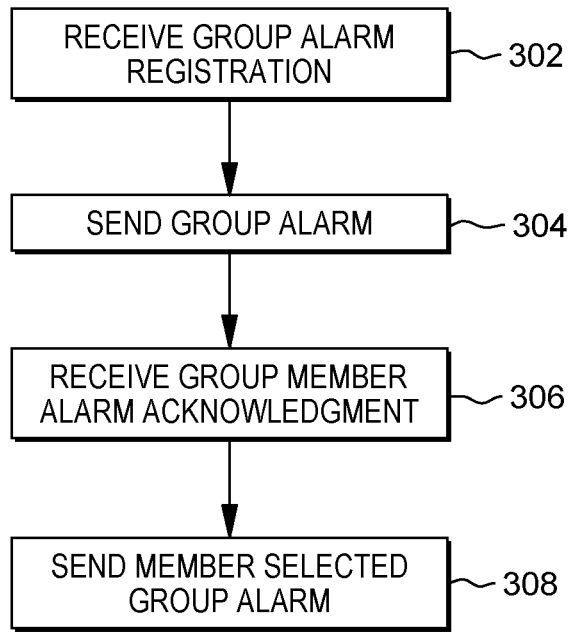
FIG. 3 is a flowchart depicting operational steps of a method for managing group member interactions with a group alarm, within a group alarm environment, in accordance with an embodiment of the present invention.

FIG. 3 is a flowchart of a method 300 depicting operational steps to interact with a group alarm. At Step 302, alarm register component 202 receives information from a group member indicating the group member request registration with a group alarm clock. The registration request information comprises group member identification, group member client device identification, group member default alarm identification, etc. It should be noted that portions of the information can be obtained by alarm registration component 202 from a group member registration record. It should be further noted that if the group alarm clock does not currently exist then the group alarm clock is created by alarm register component 202 and the information further comprises the information associated with the group alarm such as, but not limited to, the alarm time and/or event, the number of times to repeat the alarm, etc.

Next, at step 304, group alarm application 204 determines the time and/or event criteria for the group alarm occurs and sends the alarm notice to the currently registered group members. The initial alarm type can be, based on the group alarm clock configuration, the same alarm type for each group member or individual alarm types based on a default alarm type reflected by each group member registration.

Continuing at step 306, one or more alarm acknowledgements are received by alarm acknowledgement component 206. Group members receiving the alarm notice at group alarm component 106 can acknowledge the associated alarm by sending an alarm acknowledgement toward alarm acknowledgment component 206 for processing. Alarm acknowledgement component 206 determines the identity of the first group member to respond and configures the group alarm clock with the group member specified alarm based on the first responding group member to the previous alarm and removes the first responding group member to the previous group alarm from the list of group members for the next alarm.

Next at step 308, group alarm application 108 determines the occurrence of the time and/or event criteria for a subsequent group alarm, e.g., at an offset time from the previous group alarm, and sends the alarm notice to the currently registered group members who have not yet acknowledged an alarm. It should be noted in the embodiments that the group member notification list decreases by 1 with each subsequent alarm until each group member has acknowledged an alarm. Accordingly, group alarm application 108 repeats steps 306 and 308 until each group member has responded.

In one example of the method 300, Alexander is going on a vacation trip with Tony, Maya, and Michelle and they desire to create a group alarm clock. Everyone in the group registers for a group alarm clock set for 9:00 am on the day they leave for vacation. The first alarm type set for 9:00 am is soothing music. At 9:00 am, when the alarm clock plays soothing music, Maya is the first member of the group to respond and is declared the winner by alarm acknowledgement component 206. Now Maya chooses to configure the next alarm type of choice, which happens to be flashing lights, for the remaining 3 members of the group alarm clock. At 9:02 am, the second alarm type is triggered and starts flashing lights in Alexander's, Tony's, and Michelle's rooms. Tony is the first to respond, in this round, to the flashing lights in his bedroom and is declared the winner of the 2nd round by alarm acknowledgement component 206. Tony really wants to have some fun and configures an unpleasant loud buzzing noise for Michelle and Alexander. Accordingly, at 9:04 am, when the annoying buzzing noise alarm activates, Michelle quickly responds and is declared the winner of the 3rd round by alarm acknowledgement component 206. Michelle also wants to pass on the fun to Alexander, so she selects turning on the TV and cranking up the volume really loud in Alexander's room. At 9:06 am, Alexander wakes up to the TV noise alarm, and is declared the last awake member and thus, the group alarm clock terminates.

In another example, considering a group alarm clock for a family, a default wakeup alarm type of flashing bright lights is set and the very first person to respond will get to select the next alarm type, for example a loud escalating buzzing. Then the second person to respond gets to select the third alarm type, such as vibrating a smartwatch wearable, and so forth until each member of the group alarm clock, i.e. the family, has responded to the alarm.

In another embodiment, the embodiment manages a shared group alarm clock for members of a group belonging to the same calendar activity entry or a social media network. In this embodiment the group alarm clock provides a framework comprising configuring individual profiles, configuring a personal list of preferred alarm types, managing group membership and processing alarm clock responses. For example, a member creates a profile and customizes a preferred list of alarm type categories ranging from least disruptive to most disruptive, least effective to most effective, etc. Next a member registers for shared group alarm, e.g., a member manually sets smart alarm on phone or tablet, a member joins a social network and accepts the shared group alarm and a member replies to a group invitation (birthday party invite) and accepts the shared group alarm. Continuing, a member registration sends alarm date and/or time and settings to cloud service shared group alarm system. It should be noted in the embodiment that the alarm can also be triggered by an event. Next, a cloud service shared group alarm system monitors group membership and alarm types for all participants and monitors all IoT devices and/or wearables from all participants. Continuing, the cloud service shared group alarm system activates alarm types and tracks all alarm responses.

In another embodiment, the embodiment tracks, ranks, and suggests alarm types based on a member profile. This embodiment performs data management and analytics on data collected by a cloud service shared group alarm system. Next, the embodiment tracks group alarm response times, tracks duration of group alarm iterations, tracks member's personal list of alarm types and personal score feedback, rates alarm types' effectiveness (can be used as analytics), tracks overall group response times and alarm types, and rates effectiveness (can be used as analytics). It should be noted that optionally, the embodiment can track statistics history over multiple alarm clock occurrences and attempt to rebalance the group alarm. For example, if a member always selects unpleasant alarm types for the remaining group, the embodiment will no longer allow that member to select unpleasant alarm types after some threshold, and can also send the offending member an unpleasant alarm type as a default, e.g., Considering Steven always picks the most annoying alarm types for his group, after some time, the embodiment can block Steven from picking annoying alarm types for other group members, and instead the embodiment will rate/favor these annoying alarm types as Steven's own default alarm types. Next, based on analytics, the embodiment can dynamically suggest effective alarm types in various categories based on current group membership attributes and optionally offer users the incentive to earn value, e.g., reward points, money, merchandise credits, etc. related to advertised products and/or services in addition to bragging rights concerning the winner of the speed of acknowledgement race. It should be noted that an effective alarm type can be based on an analysis of a group member.

Figure 4:
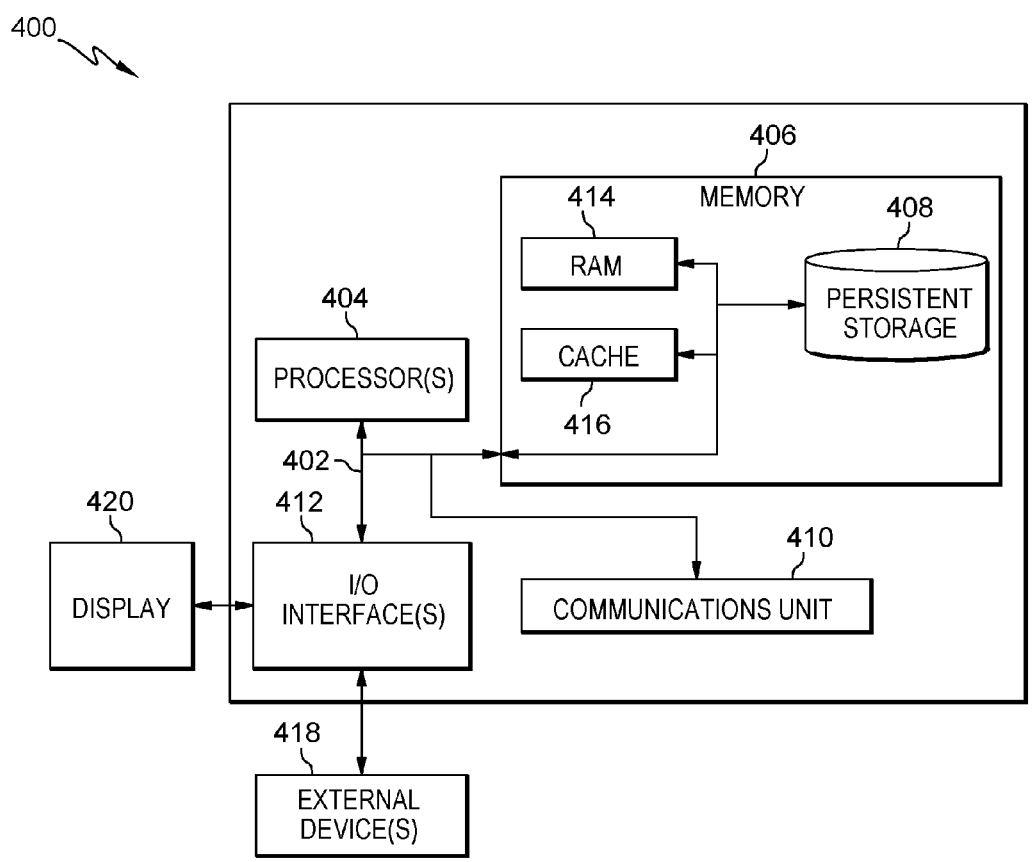
FIG. 4 is a block diagram of components of a client device and a group alarm server of a group alarm computing environment, in accordance with an embodiment of the present invention.

FIG. 4 depicts computer system 400, an example computer system representative of client device 102 and group alarm server 104. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for setting a plurality of group alarms for a group alarm clock by a plurality of members of the group alarm clock, the method comprising:
   a) receiving, by a group alarm application, a plurality of requests for membership in a group alarm clock by a group of members;
   b) configuring, by a group alarm application, a group alarm based on information associated with the group of members;
   c) determining, by the group alarm application, if a condition associated with activating the group alarm has been met;
   d) responsive to determining, by the group alarm application, that the condition has been met, sending the group alarm toward the group of members;
   e) receiving, by the group alarm application, an acknowledgement of the group alarm sent by a member of the group of members;
   f) removing the member sending the acknowledgement from the group of members;
   g) configuring, by a group alarm application, a next group alarm based on information associated with the prior acknowledgement;
   h) determining, by the group alarm application, if a next condition associated with activating the next group alarm has been met;
   i) responsive to determining the next condition has been met, sending, by the group alarm application, the next group alarm toward the group of members; and
   j) receiving, by the group alarm application, an acknowledgement of the next group alarm from a member of the group of members.

2. The method of claim 1, further comprising:
   determining, by the group alarm application, if there is at least one member in the group of members;
   responsive to determining there is at least one member in the group of members, repeating, by the group alarm application, f), g), h) i) and j) until the group of members is empty.

3. The method of claim 1, wherein the condition comprises a first date and first time and the next condition comprises an offset time from the first data and first time.

4. The method of claim 1, wherein the acknowledgement and the prior acknowledgement are associated with the first member to respond to a group alarm.

5. The method of claim 2, further comprising:
   tracking response times and durations of group alarms for each iteration of the group alarm clock.

6. The method of claim 5, wherein the group alarm clock is associated with at least one of a calendar activity and a social media network.

7. The method of claim 2, wherein group alarms and next group alarms are dynamically suggested based on an analysis of a group alarm acknowledging group member.

8. A computer program product for setting a plurality of group alarms for a group alarm clock by a plurality of members of the group alarm clock, the computer program product comprising:
   one or more non-transitory computer readable storage media and program instructions stored on the one or more non-transitory computer readable storage media, the program instructions comprising:
      a) program instructions to receive, by a group alarm application, a plurality of requests for membership in a group alarm clock by a group of members;
      b) program instructions to configure, by a group alarm application, a group alarm based on information associated with the group of members;
      c) program instructions to determine, by the group alarm application, if a condition associated with activating the group alarm has been met;
      d) responsive to program instructions to determine that the condition has been met, program instructions to send, by the group alarm application, the group alarm toward the group of members;
      e) program instructions to receive, by the group alarm application, an acknowledgement of the group alarm sent by a member of the group of members;
      f) program instructions to remove the member sending the acknowledgement from the group of members;
      g) program instructions to configure, by a group alarm application, a next group alarm based on information associated with the prior acknowledgement;
      h) program instructions to determine, by the group alarm application, if a next condition associated with activating the next group alarm has been met;
      i) responsive to determining the next condition has been met, sending, by the group alarm application, the next group alarm toward the group of members; and
      j) receiving, by the group alarm application, an acknowledgement of the next group alarm from a member of the group of members.

9. The computer program product of claim 8, further comprising:
   determining, by the group alarm application, if there is at least one member in the group of members;
   responsive to determining there is at least one member in the group of members, repeating, by the group alarm application, f), g), h) i) and j) until the group of members is empty.

10. The computer program product of claim 8, wherein the condition comprises a first date and first time and the next condition comprises an offset time from the first data and first time.

11. The computer program product of claim 8, wherein the acknowledgement and the prior acknowledgement are associated with the first member to respond to a group alarm.

12. The computer program product of claim 9, further comprising:
   tracking response times and durations of group alarms for each iteration of the group alarm clock.

13. The computer program product of claim 12, wherein the group alarm clock is associated with at least one of a calendar activity and a social media network.

14. The computer program product of claim 9, wherein group alarms and next group alarms are dynamically suggested based on an analysis of a group alarm acknowledging group member.

15. A computer system for setting a plurality of group alarms for a group alarm clock by a plurality of members of the group alarm clock, the computer system comprising:
   one or more computer processors;
   one or more non-transitory computer readable storage media;

program instructions stored on the one or more non-transitory computer readable storage media for execution by at least one of the one or more computer processors, the program instructions comprising:
- a) program instructions to receive, by a group alarm application, a plurality of requests for membership in a group alarm clock by a group of members;
- b) program instructions to configure, by a group alarm application, a group alarm based on information associated with the group of members;
- c) program instructions to determine, by the group alarm application, if a condition associated with activating the group alarm has been met;
- d) responsive to program instructions to determine that the condition has been met, program instructions to send, by the group alarm application, the group alarm toward the group of members;
- e) program instructions to receive, by the group alarm application, an acknowledgement of the group alarm sent by a member of the group of members;
- f) program instructions to remove the member sending the acknowledgement from the group of members;
- g) program instructions to configure, by a group alarm application, a next group alarm based on information associated with the prior acknowledgement;
- h) program instructions to determine, by the group alarm application, if a next condition associated with activating the next group alarm has been met;
- i) responsive to determining the next condition has been met, sending, by the group alarm application, the next group alarm toward the group of members; and
- j) receiving, by the group alarm application, an acknowledgement of the next group alarm from a member of the group of members.

16. The computer system of claim 15, further comprising:
determining, by the group alarm application, if there is at least one member in the group of members;
responsive to determining there is at least one member in the group of members, repeating, by the group alarm application, f), g), h) i) and j) until the group of members is empty.

17. The computer system of claim 15, wherein the condition comprises a first date and first time and the next condition comprises an offset time from the first data and first time.

18. The computer system of claim 15, wherein the acknowledgement and the prior acknowledgement are associated with the first member to respond to a group alarm.

19. The computer system of claim 16, further comprising:
tracking response times and durations of group alarms for each iteration of the group alarm clock.

20. The computer system of claim 16, wherein group alarms and next group alarms are dynamically suggested based on an analysis of a group alarm acknowledging group member.

* * * * *